April 20, 1965 W. E. THORNTON-TRUMP 3,179,016
HYDRAULIC WHEEL
Filed Aug. 3, 1961 5 Sheets-Sheet 4

INVENTOR.
Walter E. Thornton-Trump
BY
Hovey, Schmidt, Johnson & Hovey
ATTORNEYS.

INVENTOR.
Walter E. Thornton-Trump
BY
ATTORNEYS.

United States Patent Office 3,179,016
Patented Apr. 20, 1965

3,179,016
HYDRAULIC WHEEL
Walter E. Thornton-Trump, Oliver, British Columbia, Canada, assignor to Trump Engineers Ltd., Oliver, British Columbia, Canada
Filed Aug. 3, 1961, Ser. No. 129,176
19 Claims. (Cl. 91—205)

The present invention relates to a power drive, and more particularly to a wheel having a hydraulic fluid drive contained therewithin for driving the wheel.

It is an object of the present invention to provide a power drive mechanism contained within a wheel which may be selectively engaged with the wheel so that the power drive may be used to drive the wheel when the occasion demands, but to permit free-wheeling of the wheel when such driving force is not required.

It is a further object of the present invention to provide a wheel of the character described wherein the wheel includes a fixed axle and a wheel hub rotatably mounted on the axle with hydraulic power drive mechanism located within the wheel between the axle and the hub and engageable with the axle to prevent movement of a portion of the mechanism relative to the axle, whereby the hub is driven by said mechanism when the portion is in engagement with said axle, and said mechanism and hub are freely rotatable on said axle when said portion is disengaged from said axle.

It is another object of the present invention to provide structure of the character above described, wherein the axle is provided with a fixed clutch plate having hydraulically actuated structure supplied by fluid lines in the axle for engaging the aforesaid portion of the mechanism, so that the portion may remain rotatable with the wheel on said axle until such time as the hydraulically actuated structure is coupled therewith to thereby interconnect the drive mechanism to the axle.

It is a further object of the present invention to provide structure of the character described, wherein the drive mechanism includes a plurality of radially disposed, circumferentially spaced cylinders, each having a reciprocable piston therein and pilot valve means coupled thereto for controlling the flow of hydraulic fluid to and from the cylinders to reciprocate the piston so that the driving action of each of said cylinders is derived from the sliding engagement of said piston on the aforesaid portion under the action of hydraulic fluid against the piston and controlled by said pilot valve structure.

Still another object of the present invention is the provision of an eccentric which may be fixed to the axle and engaged by the piston as said hub rotates relative to the axle to force the piston outwardly from said axle, whereby the fluid in the cylinders for driving the pistons is exhausted to hydraulic return lines as said pistons move about said eccentric to thereby position the pistons for movement toward the axle under the action of hydraulic fluid entering the cylinders.

A further object of this invention is the provision of a symmetrical, two-lobe cam providing the aforesaid eccentric and movable into fixed engagement with said axle, whereby dynamic balance of the wheel and axle system is maintained regardless of whether the cam is fixed to the axle or freely rotatable thereon, thus rendering the system especially adapted for movement at relatively high speeds.

Yet another object of the present invention is the provision of a symmetrical, two-lobe cam which provides the aforementioned eccentric about which the pistons move, whereby the power impulse derivable from the use of the two-lobe cam is double that derived from an eccentric having a single lobe. Thus, the power output of the system containing the two-lobe cam is increased with no corresponding increase in the size or stroke of the drive mechanism.

A power-driven wheel 10 shown in the drawings, includes generally, a rim 12 circumscribing a wheel central portion 14 and an axle or shaft 16 provided with a cap 18 on the normally outermost end thereof. Central portion 14 consists of an annular hub 20 circumscribing axle 16, and provided with inboard and outboard roller bearings 22 and 24 respectively (FIG. 3), rotatably supporting hub 20 upon the axle 16.

Figures 3, 6:
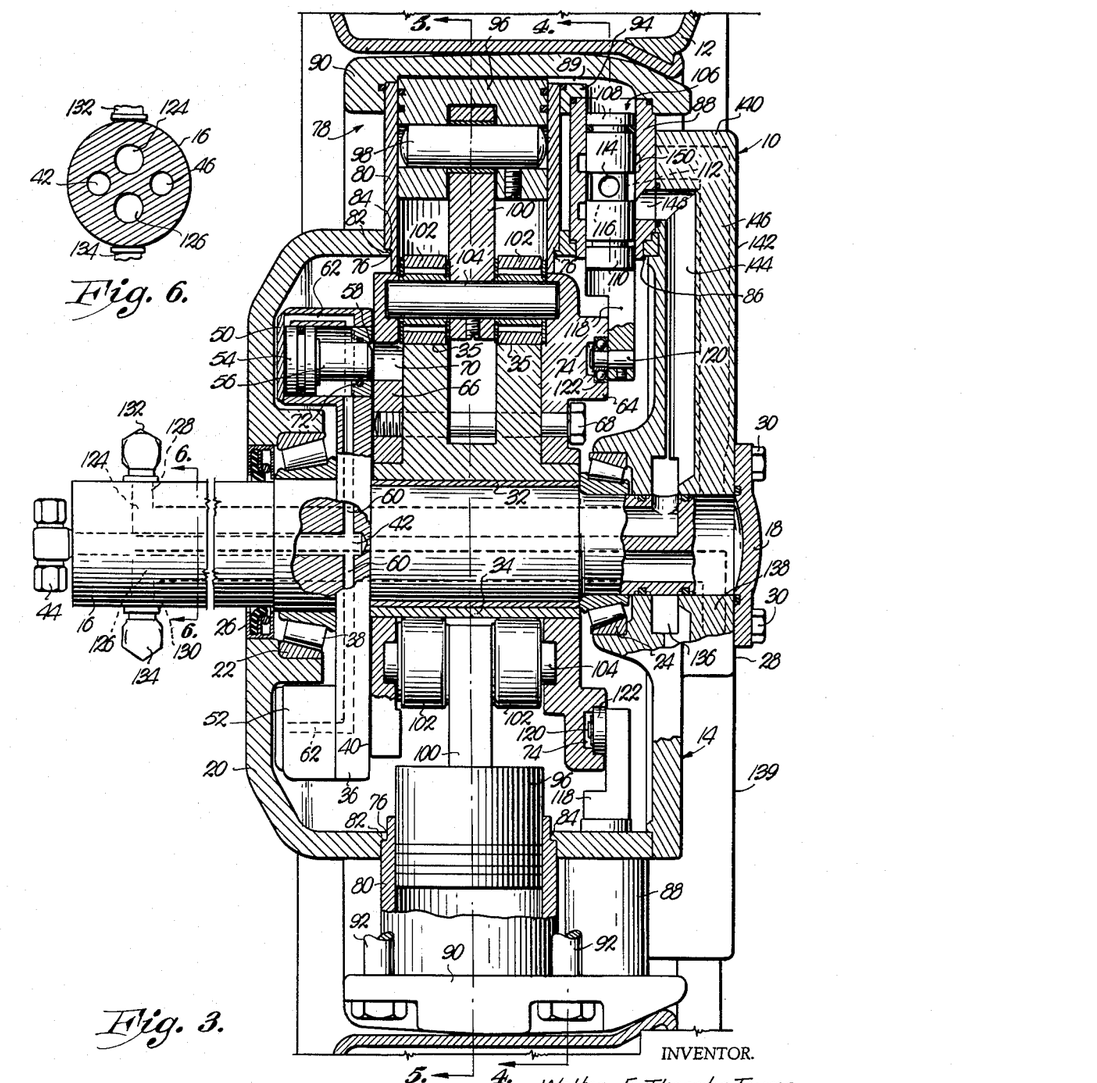
FIG. 3 is a cross-sectional view taken along line 3—3 of FIG. 1 looking in the direction of the arrows and illustrating one embodiment of the mechanism for driving the wheel and rim shown in FIG. 1.
FIG. 6 is a cross-sectional view taken along line 6—6 of FIG. 3 looking in the direction of the arrows.

An annular seal assembly 26 in surrounding relationship to axle 16, is provided on the inboard side of hub 20 within an annular recess in the latter, and cap 18 is fastened to the outboard side of hub 20 by suitable bolts 30 provided for this purpose. A sleeve bearing 32 surrounds shaft 16 intermediate roller bearings 22 and 24, and a first cam 34 surrounds sleeve bearing 32 and is eccentrically mounted relative to axle 16. Cam 34 is provided with spaced bearing surfaces 35 which merge into a single surface as the point opposite to the lobe 37 thereof (FIG. 5) is approached. An annular clutch plate 36 is fixed to axle 16 intermediate sleeve bearing 32 and roller bearing 22, and is provided with an inboard side 38 bearing against the roller bearing 22 and an outboard side 40 bearing against the sleeve bearing 32 and cam 34.

A first fluid passageway 42 is provided in and extending longitudinally through axle 16 from the inboard end thereof to a point adjacent outboard edge 40 of clutch plate 36. A first fluid T-connection 44 is threadably engaged with axle 16 at the inboard end of passageway 42. A second passageway 46 parallel with and adjacent to passageway 42, is also provided in axle 16 and illustrated in FIG. 6. A second fluid T-connection 48 is threadably mounted on axle 16 at the inboard end of passageway 46, and shown in FIG. 2.

At approximately diametrically opposed points adjacent the outer periphery of clutch plate 36, a pair of piston housings 50 and 52 are mounted and contain reciprocable pistons 54 therein, only one of said housings being shown in FIG. 3. Each piston 54 has a connecting pin 56 extending axially therefrom toward cam 34, and when the corresponding piston 54 is forced toward cam 34, pin 56 passes through an aperture 58 provided in plate 36.

A pair of first, oppositely directed, fluid-carrying conduits 60, is shown in FIG. 3 and interconnects passageway 42 with each of piston housings 50 and 52 on one side of the corresponding piston 54. Conduits 60 carry hydraulic fluid from passageway 42 to housings 50 and 52 to drive pistons 54 in a direction away from cam 34. Similarly, a pair of second, oppositely directed, fluid-carrying conduits 62 interconnect fluid pasasgeway 46 with piston housings 50 and 52 on the opposite side of pistons 54 for carrying hydraulic fluid to housings 50 and 52 to drive pistons 54 toward cam 34. It is to be understood that as pistons 54 are driven in either direction, the hydraulic fluid on the side of the housings 50 and 52 toward which the pistons 54 move is driven out through the respective conduits 60 and 62 to the respective passageways 42 and 46.

A second cam 64 and a clutch pin-receiving plate 66 surround axle 16 and are secured respectively to the outboard and inboard sides of cam 34 by virtue of a plurality of bolts 68 extending through second cam 64, first cam 34 and threadably engaged in plate 66. The clutch pin-receiving plate 66 is provided with a pair of apertures 70, only one of which is shown in FIG. 3, for receiving pins 56 when the same are reciprocated through apertures 58 when hydraulic fluid is supplied to housings 50 and 52 through conduits 62. Apertures 58 are each provided with an O-ring seal 72 to prevent fluid leakage from chambers 50 and 52. The outboard face of second cam 64 is provided with a continuous and irregular cam groove 74 in surrounding relationship to axle 16.

Figure 1:
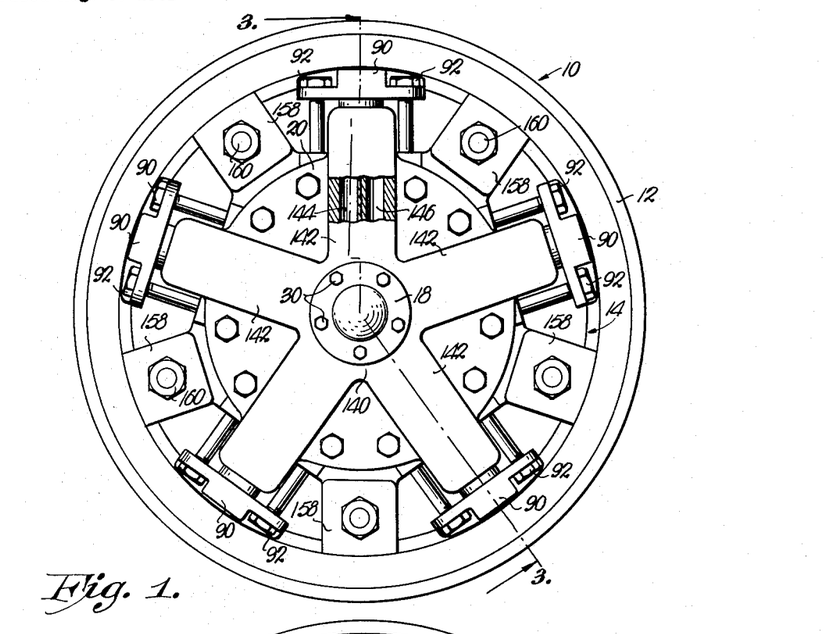
FIGURE 1 is a side elevational view of a wheel and rim involving the present invention, taken from the outwardly facing side of the wheel and having portions broken away and shown in section to reveal details of construction.

As shown in FIGS. 1 and 3, hub 20 is generally cylindrical in shape and is provided with a plurality of circumferentially spaced openings 76 (only one of which is shown) in the outer peripheral surface thereof for receiving elongated, hydraulically actuated assemblies 78, the latter being secured rigidly to hub 20. All of the openings 76 lie in the same vertical plane through hub 20 so that the assemblies 78 are secured to hub 20 with the longitudinal axes of the assemblies 78 being substantially coincident with coplanar lines radiating from a central point on axle 16. Since all of the assemblies 78 are the same, only one will be described.

Each assembly 78 consists of a first cylindrical sleeve 80 which is received in opening 76 and extends outwardly therefrom. Hub 20 is provided with an annular projection 82 extending inwardly into and surrounding the opening 76. Sleeve 80 is provided with an annular shoulder 84 which complementally engages projection 82 for supporting sleeve 80 on hub 20, sleeve 80 being secured rigidly to hub 20 in any suitable manner.

Figure 2:
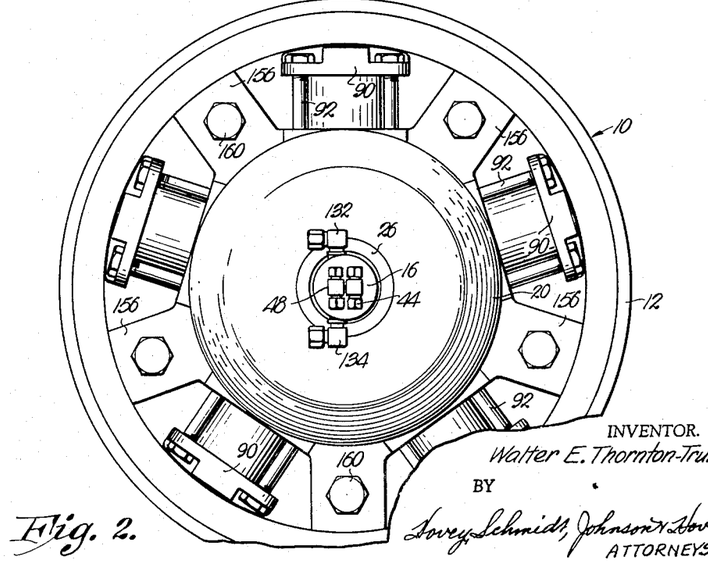
FIG. 2 is a fragmentary, side elevational view of a wheel and rim shown in FIG. 1, and taken from the inwardly facing side of the wheel.

A plurality of second openings 86 are provided in the outer peripheral surface of hub 20 in a vertical plane through the latter, parallel to, and spaced from the plane in which the openings 76 lie, one opening 86 being provided for and paired with each opening 76. A second cylinder sleeve 88 is fitted into the opening 86 in a similar manner to that described with reference to the sleeve 80 and opening 76. It is to be noted that the outermost ends of first sleeves 80 and the corresponding second sleeves 88 are in fluid communication by virtue of a fluid passage 89, shown in FIG. 3. A cylinder cap 90 extends over the top of sleeves 80 and 88 in closing relationship to the outermost ends thereof, and a pair of spaced bolts 92, shown in FIGS. 1, 2 and 3, is provided for fastening each cap 90 to hub 20. An annular block 94 is provided between the proximal portions of sleeves 88 and 80 to prevent fluid leakage in the annular space therebetween and to define, with cap 90, the fluid passage 89.

Figure 5:
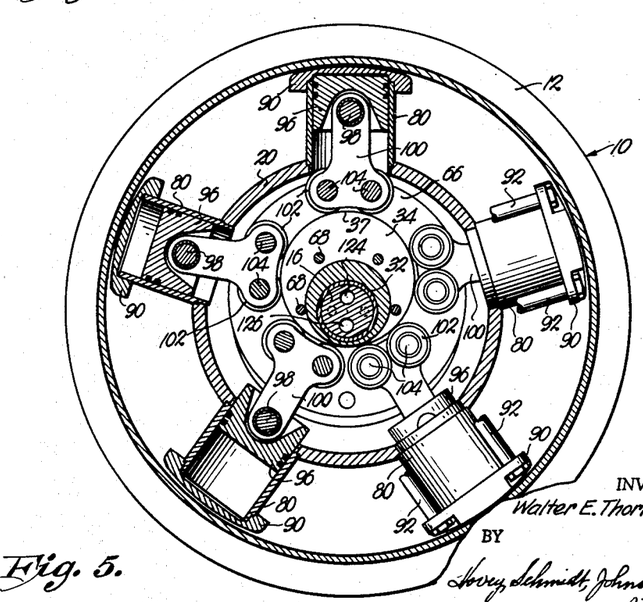
FIG. 5 is a fragmentary, cross-sectional view taken along line 5—5 of FIG. 3 looking in the direction of the arrows and with portions broken away and shown in section to reveal details of construction.

A pistonhead 96 is slidably received in each sleeve 80 and is connected by a wrist pin 98 to a T-shaped piston rod 100 extending toward axle 16. The end of piston rod 100, remote from pistonhead 96, is provided with a pair of rollers 102 mounted on spaced shafts 104, as shown in FIG. 5. The rollers 102 rotatably engage the outer peripheral surface of cam 34 and move about the latter when cam 34 is held rigid to shaft 16. Thus, it can be seen that the reciprocation of piston 96 is directly dependent upon the position of cam 34 when the latter is fixed to axle 16.

Pilot valve piston structure 106 is received within each sleeve 88 and includes a pair of spaced, axially aligned pistonheads 108 and 110 (FIG. 3) joined at their proximal ends by connector 112 provided with a transverse passageway 114 extending therethrough, and with an axial passageway 116 communicating with passageway 114 and extending through piston 108 to intercommunicate passageway 114 with passage 89.

A connecting rod 118 is connected with the pistonhead 110 and extends radially inwardly therefrom. A stub shaft 120 is journalled at the innermost end of connecting rod 118 and extends from the latter toward cam 64. A cam follower roller 122 is rotatably mounted on the protruding end of shaft 120 and is received within groove 74 of cam 64 so that reciprocating movement of each structure 106 within the corresponding sleeve 88 occurs when cam 64 is fixed to axle 16 and when hub 20 rotates relative to the latter.

A pair of longitudinally extending fluid passageways 124 and 126 are provided in axle 16 and extend through the latter as shown in dashed lines in FIG. 3. Passageways 124 and 126 terminate in respective inlets 128 and 130 at the inboard end of axle 16 and fluid connections 132 and 134 are secured to axle 16 at inlets 128 and 130 respectively. A fluid source is connected to connections 132 and 134 to supply fluid to passageways 124 and 126.

Adjacent the outboard end of axle 16 are a pair of annular depressions 136 and 138 in the portion 140 (FIG. 1) of hub 20 in the vicinity of axle 16. Depressions 136 and 138 are illustrated in FIG. 3, with depression 138 shown in dashed lines. A plurality of arms 142 radiate from portion 140 of hub 20 and are integral therewith, arms 142 thus forming a part of hub 20. Arms 142 extend outwardly from axle 16 and terminate adjacent corresponding assemblies 78. A pair of fluid passages 144 and 146 are disposed within and through each arm 142, and passages 144 and 146 terminate at the outermost end of the respective arm 142 at the spaced outlet openings 148 and 150 respectively. Openings 148 and 150 are disposed in communication with corresponding openings in the side wall of the corresponding sleeve 88 so that the fluid passages 144 and 146 may be placed in fluid communication with the interior of the sleeve 88.

The radially innermost ends of passages 144 and 146 communicate with the annular depressions 136 and 138 respectively so that fluid passing into passageways 124 and 126 may pass through fluid passages 144 and 146 respectively, and into the corresponding sleeve 88.

It is evident that piston heads 108 and 110 of each pilot valve structure 106, effectively close off the openings corresponding to the openings 148 and 150 in the side wall of sleeve 88 so as to prevent the flow of fluid from passages 144 and 146 into the sleeve 88 and thus, through passageways 114, 116 and 89 to the radially outermost end of the corresponding sleeve 80. Since arms 142 rotate relative to axle 16, depressions 136 and 138 maintain passages 144 and 146 in fluid communication with corresponding passageways 124 and 126 at all times.

Figure 4:
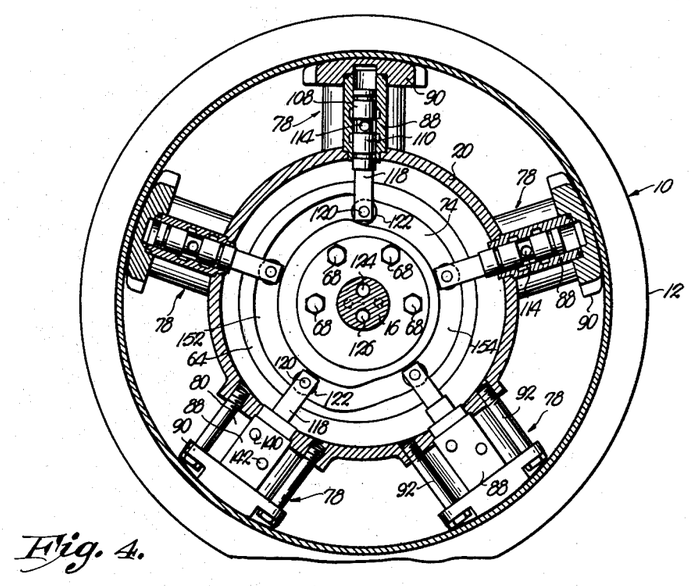
FIG. 4 is a fragmentary, cross-sectional view taken along line 4—4 of FIG. 3 looking in the direction of the arrows, with portions broken away and shown in section to show details of construction.

Grooves 74 on cam 64 are provided with a pair of semi-circular portions 152 and 154 (FIG. 4), portion 154 being of a lesser diameter than the portion 152. Portions 152 and 154 merge together at diametrically opposed points, as shown in FIG. 4, and when the rollers 122 are disposed within the portion 152 of groove 74, the corresponding connecting rods 118 are directed radially outwardly from axle 16 and force pistonheads 110 into closing relationship to opening 148 and pistonheads 108 into a position placing fluid passage 146 into communication with sleeve 88. Conversely, when rollers 122 are in the portion 154 of groove 74, the connecting rods 118 are directed toward the axle 16 so that pistonheads 108 close the corresponding openings 150 and pistonheads 110 move to positions permitting fluid communication between fluid passages 144 and the interior of sleeve 88.

Hub 20 is provided with a plurality of radially extending ears 156 which are disposed adjacent the outermost portion of hub 20, and are illustrated in FIG. 2 of the drawings. Ears 156 mate with, and are secured to lugs 158 which are secured to the rim 12 and extend inwardly toward axle 16. Nut and bolt means 160 interconnect ears 156 with lugs 158 to interconnect rim 12 with hub 20.

In operation, hub 20, assemblies 78, pilot valve structures 106, cams 34 and 64, and plate 66, all rotate about fixed axle 16 when the pins 56 within piston housings 50 and 52 are out of engagement with the corresponding apertures 70. Thus, a freewheeling condition of wheel 10 is provided, and wheel 10 continues to rotate so long as pins 56 are out of engagement with the corresponding apertures 70.

When it becomes necessary to provide additional traction to the vehicle to which wheel 10 is operably coupled, fluid is introduced into passageway 46 and conduit 62 of each of cylinder housings 50 to drive the corresponding pistons toward the cam 34 to thus force the pins 56 into apertures 70. In effect, this action locks cam 34 on stationary axle 16 and cam 34 is thus rendered stationary with the latter. As pistons 54 move toward a position with the pins 56 disposed in apertures 70, the pistons 54 drive fluid out of housings 50 and 52 through conduit 60, and then to return line 42. Pins 56 remain in apertures 70 since the fluid pressure on the pistons 54 is such as to maintain the pins in an outboard direction relative to the outer end of axle 16.

Simultaneously with the directing of fluid to housings 50 and 52 to force pins 56 into apertures 70, fluid is admitted to one of the passageways 124 or 126, and then to the corresponding passage 144 or 146, through pilot valve structures 106, and thence to the outermost ends of corresponding sleeves 80 into driving relationship with pistons 96 in the latter. For example, if fluid is directed from a source to passageway 124, fluid then flows into the corresponding depression 136, through passages 144, and into sleeves 88 when rollers 122 engage the portion 154 of groove 74. It is clear that fluid passes from the interior of each sleeve 88, through passage 116, through passage 89, and into the corresponding sleeve 80 at the outermost end thereof to thus drive the piston 96 radially inwardly.

If passageway 124 is the pressure line, passageway 126 represents the return line so that fluid is returned from the sleeves 80 through passages 89, 116, passages 146 into depression 138 and into passageway 126, when rollers 122 are disposed within portion 152 of groove 74. It is evident that pistonheads 110 thus closes off opening 148 and pistonheads 108 move so as to permit fluid to flow from the interior of sleeves 88 to the corresponding passages 146.

Portions 152 and 154 of groove 74 are positioned so that fluid is admitted to each sleeve 80 when the rollers 102 on the piston rod 100, corresponding to the last-mentioned sleeve 80, engage cam 34 at the lobe 37 thereof as illustrated in FIG. 5. As fluid is forced into the sleeve 80, the fluid force directs the piston 96 radially inwardly and thus drives the piston 80 about cam 34 toward the point on the latter opposite to lobe 37 thereof. As rollers 102 pass the point on cam 34 opposite to lobe 37, the connecting rods 118 shift outwardly and rollers 122 thereof pass into portion 152 of groove 74. When this occurs, pistonheads 108 open sleeves 88 to the corresponding passages 146 to permit fluid to return through the passageway 126 to the source connected to connection 134.

When passageway 124 is the pressure line, wheel 10 is caused to rotate in one direction and fluid is returned through passageway 126 to the source. Conversely, when passageway 126 is the pressure line, wheel 10 rotates in the opposite direction and passageway 124 serves as the return line for directing fluid from sleeves 80 to the fluid source.

When it is desired to cease the driving action of wheel 10 due to the action of fluid within sleeves 80, fluid is delivered through passageway 42 to conduits 60 to force the pistons 54 away from cam 34. When this occurs, pins 56 move out of apertures 70 and once again cam 34 and cam 64 are rendered freely rotatable about axle 16.

A second embodiment of the means for driving wheel 10 is illustrated in FIGS. 7 to 10 inclusive and includes an axle 216 about which is rotatably mounted a hub 220 by virtue of a pair of inboard and outboard roller bearings 222 and 224 respectively. A seal 226 is provided on the inboard side of hub 220 in surrounding relationship to axle 216, and prevents the flow of fluid between the interconnection of hub 220 on axle 216. A sleeve bearing 232 surrounds axle 216 intermediate roller bearings 222 and 224, and a transversely elliptical cam member 234, in the nature of a two-lobe cam, surrounds sleeve bearing 232 for rotation about axle 216. Cam 234 is provided with opposed lobes 237 and a continuous peripheral surface, as is clear in FIG. 9. Cam 234 is provided with spaced bearing surfaces 235 which merge into a single surface at opposed points on cam 234 intermediate the opposed lobes thereof.

An annular element 236 is integral with axle 216 and extends outwardly therefrom adjacent inboard bearing 222. Element 236 is provided with a fluid passage 237 therein which communicates with a passage 239 disposed in axle 216 and extending longitudinally thereof. Passage 239 is adapted to be connected to a source of fluid under pressure for directing the fluid into passage 237. The outermost end of passage 237 is closed by means of a blocking member 240 and element 236 is provided with a pair of annular grooves 241 and 242 therein adjacent the outermost end of passage 237. Each groove 241 and 242 is provided with an O-ring 243 disposed therewithin and bearing against a projection 244 integral with a corresponding clutch plate 245. Plates 245 are provided with frictionable material 246 on the faces thereof opposed to grooves 241 and 242 and engage adjacent surfaces of a structural member 247 rigidly secured to cam 234. Fluid directed into passages 237 and 239 force the O-rings 243 toward the corresponding clutch plates 245 to move the material 246 into engagement with the corresponding surfaces of structure 247. This in effect, interconnects cam 234 to axle 216 to render cam 234 stationary relative to axle 216.

Hub 220 is provided with a plurality of cylindrical sleeves 280 secured thereto in suitable openings 276 which are circumferentially spaced about the axis of axle 216. Pistons 296 are disposed within sleeves 280, and triangularly-shaped piston rods 300 are connected to corresponding pistons 296 through wrist pins 298 to render the piston rods 300 shiftable relative to the pistons 296. A cap 290 closes the outermost end of each sleeve 280 to enclose the latter for containing fluid directed into the sleeve 280 for reciprocating the respective piston 296.

The end of each piston rod 300 remote from piston 296, is provided with a pair of rollers 302 mounted on spaced shafts 304. Rollers 302 rotatably engage the outer peripheral surface of cam 234 and move about the latter when cam 234 is held rigid to axle 216. Thus, it can be seen that the reciprocation of pistons 296 is directly dependent upon the position of cam 234 when the latter is fixed to axle 216.

Figure 7:
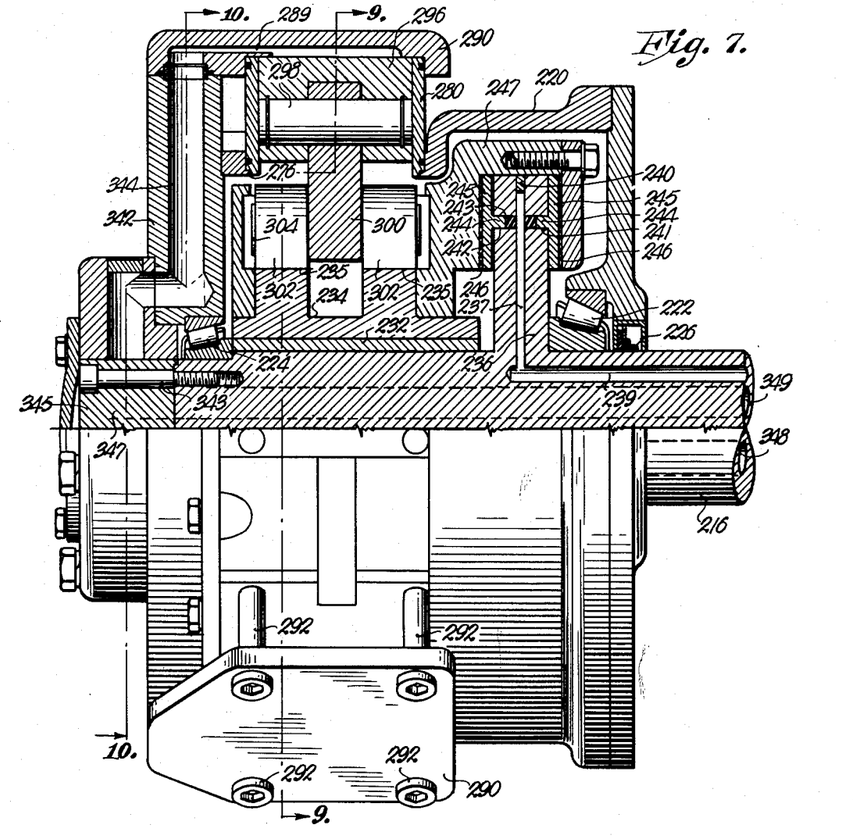
FIG. 7 is a fragmentary, end elevational view of the present invention and illustrating a second embodiment of the drive mechanism therefor, parts being broken away and in section to reveal details of construction.
Figure 10:
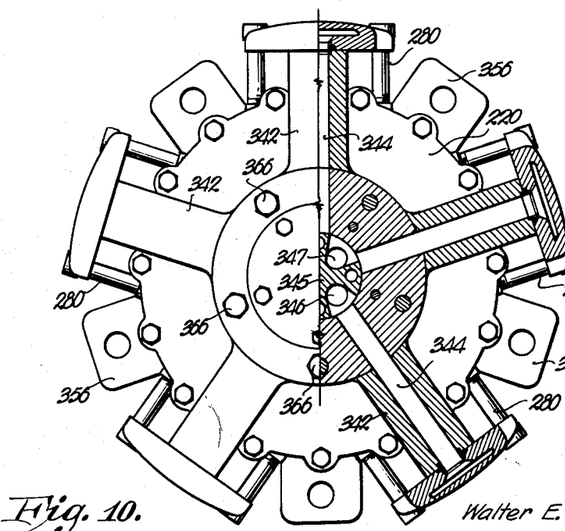
FIG. 10 is a view taken along line 10—10 of FIG. 7, parts being broken away and in section to reveal details of construction.

Hub 220 includes a pair of radially extending, circumferentially spaced arms 342 as illustrated in FIGS. 7 and 10. Arms 342 are each provided with a fluid passage 344 therein which extends longitudinally thereof and terminates at the outermost end thereof in fluid communication with the corresponding sleeve 280 by virtue of a passage 289. The radially innermost ends of passages 344 are operably coupled to a valve member 345 rigid to axle 216 and secured thereto by a plurality of elongated screws 343 extending axially outwardly therefrom at the outboard end of axle 216. Valve member 345 is provided with a pair of first fluid passages 346 and a pair of second fluid passages 347 therein which communicate with the outboard ends of respective first and second fluid passages 348 and 349 in axle 216. Passages 348 and 349 are adapted to be operably coupled to the pressure and return lines of a source of fluid under pressure so as to alternately supply and draw fluid from the passages 344. First passages 346 in valve member 345, extend through the latter on opposed sides of the axis thereof coincident with the longitudinal axis of axle 216. Second fluid passages 347 of valve member 345 likewise are disposed therein on opposed sides of the axis thereof and lie on a line substantially perpendicular to the line interconnecting first passages 346. Similarly, the pair of passages 348 in axle 216, lie on a line substantially perpendicular to the line interconnecting second passages 349.

Valve member 345 has an outlet corresponding to each of the first and second fluid passages 346 and 347 with the outlets being flared outwardly as illustrated in FIG. 10 so as to simultaneously interconnect a pair of adjacent passages 344. Each passage 346 of valve member 345 is disposed between and adjacent a pair of fluid passages 347, and each second fluid passage 347 is disposed adjacent and between a pair of first fluid passages 346. By virtue of this construction, each fluid passage 344 in a corresponding arm 342, is alternately placed in fluid communication with a first fluid passage 346 and then a second fluid passage 347 as arms 342 rotate about axle 216. Thus, if passages 348, to which first fluid passages 346 are connected, represent the pressure side of the source of fluid, fluid is directed to passages 344 and into the outermost ends of sleeves 280 to drive the pistons 296 radially inwardly. Passages 349 then represent the return side of the fluid line so that fluid is returned from the interior of sleeves 280 through second passages 347 and then into passages 349 of axle 216. It is clear that when first passages 346 represent the pressure line, the wheel on which the device of FIG. 7 is operably coupled, rotates in one direction. When second fluid passages 347 represent the pressure line, the wheel rotates in the opposite direction and first fluid passages 346 then represent the return side of the hydraulic line.

Hub 220 is provided with a plurality of radially extending ears 356, each ear 356 being positioned between correspondingly adjacent sleeves 280. Ears 356 mate with, and connect with lugs 158 of rim 12 to thus interconnect hub 220 to the latter. Suitable screws pass through aligned openings in the ears 356 and the lugs 158 to accomplish the aforesaid interconnection.

In operation, axle 216 is secured to a vehicle and does not rotate at any time. In normal operation, cam 234 and structure 247 rotate about axle 216, together with hub 220. Thus, cam 234 and structure 247 are in a substantially freewheeling condition and no power is derived from the actuation of pistons 296.

When it is desired to increase the traction of the wheel to which hub 220 is attached, fluid is directed into passage 239, passage 237 and against O-rings 243 to force the projections 244 outwardly in the grooves 241 and 242 to force the plates 245 and thereby the frictionable material 246 into engagement with the corresponding surfaces of structure 247. Thus, cam 234 is interconnected with axle 216 and is rendered stationary relative to the latter. Simultaneously thereby, fluid is directed into one of the first or second passages 348 or 349 to direct fluid into the passages 344 through either of the first and second passages 346 and 347 of valve member 345. For example, if passages 348 are connected to the pressure side of a source of fluid, fluid passes from passages 348 into passages 346 and then into passages 344 and 289. Thereupon, fluid enters the sleeves 280 and forces the pistons 296 radially inwardly and rollers 302 rotate in engagement with and about cam 234. In this example, second passages 347 of valve member 345, and second passages 349 of axle 216, represent the return lines for directing fluid back to the source when the fluid is forced out of the sleeves 280 when pistons 296 move radially outwardly.

As fluid is caused to enter the sleeves 280, pistons 296 are forced inwardly toward axle 216 and, since cam 234 is stationary, the inward movement of the pistons 296 causes hub 220 to rotate about cam 234. As hub 220 rotates about cam 234, the corresponding passages 344 rotate alternately into and out of fluid communication with first and second fluid passages 346 and 347. Thus, it is evident that each passage 344 is alternately supplied with fluid and exhausted of fluid as the same rotates about the axis of axle 216.

As each piston 296 traverses the distance between lobes 237, the piston is directed radially inwardly until the same is substantially halfway between the lobes 237. Thereupon, piston 296 begins to move radially outwardly, thus forcing the fluid in the corresponding sleeve 280 outwardly through the line 344 and into the return line to be returned to the source of fluid. As rollers 302 approach the next adjacent lobe 237, the corresponding passage 344 moves into alignment with the pressure passage of valve member 345 so as to repeat the process of directing the piston 296 radially inwardly.

When it is desired to cease the driving action of pistons 296, the fluid in passages 237 and 239 is returned to the source, thus permitting the plates 245 to move toward each other and therefore, move out of engagement with structure 247. Thereupon, cam 234 is rendered rotatable about axle 216 and once again is in the freewheeling condition.

Figure 8:
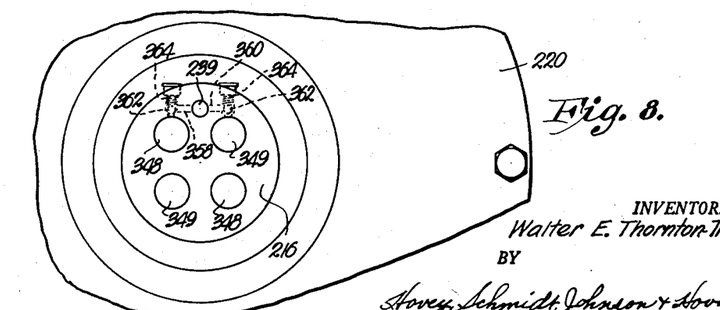
FIG. 8 is an enlarged, fragmentary, side view of the valve means interconnecting the fluid lines directed to the clutch means and cylinders providing the drive mechanism for the present invention.
Figure 9:
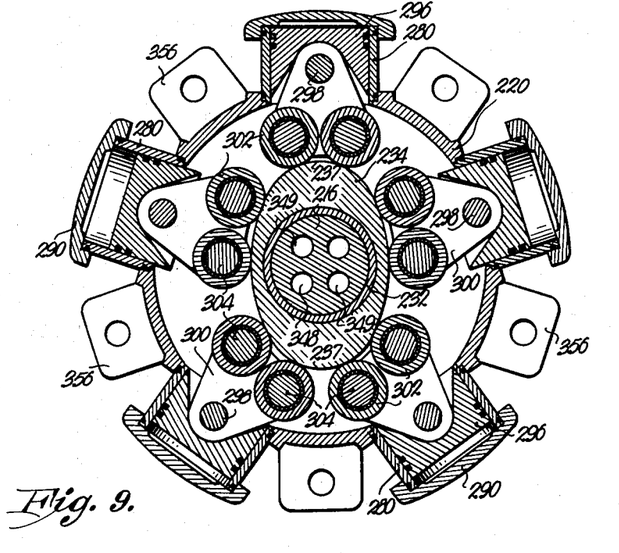
FIG. 9 is a cross-sectional view taken along line 9—9 of FIG. 7.

In FIG. 8, passages 348 and 349 are shown interconnected with fluid passage 239 by virtue of interconnecting passages 358 and 360. Valve elements 362 in the nature of ball check valves are normally biased by springs 364 into closing relationship with the outlets of passages 348 and 349, thus blocking the flow of fluid from the latter to the passage 239. In the event that the fluid pressures within passages 348 and 349 are greater than the pressure within passage 239, fluid is directed into the latter to increase the fluid pressure action the O-rings 243. This in effect, increases the pressure on plates 245 and thus will make the clutch driving force proportional to the pressure within the fluid passages 348 and 349.

It is evident that valve member 345, in conjunction with arms 342, provides a two-piece valve similar to the distributor type and which is hydraulically balanced because the pair of first passages 346 are in opposition and the pair of second passages are also in opposition. Since valve member 345 is detachable from axle 216 by virtue of screws 343, and since arms 342 are detachable from hub 220 by a plurality of screws 366, the same may be removed and replaced by similar structure having more or less fluid passages therein.

The two-lobe cam 234 permits an increase in the diameter of the axle 216 and further permits an increase in the number of fluid passages in the latter. Thus, the flow of fluid to the sleeves 280 is increased to thus result in a higher speed of the wheel to which hub 220 is attached. Cam 234 further permits two power impulses per sleeve 280 and also cuts the stroke in half to thereby reduce the piston speed and the resulting inertia loadings.

By virtue of the interconnection of fluid passages 348 and 349 with passage 239, the clutch-engaging force increases as the speed of the wheel increases, thus providing a tighter and more positive clutching action.

Although the clutch arrangement as set forth in the second embodiment comprises a pair of shiftable clutch plates 345, it is evident that the clutch may be of the type similar to the expanding brake shoe devices of conventional automotive brakes. In this last-mentioned arrangement, the brake shoes may frictionally engage the inner surface of a drum rigid to cam 234, the brake shoes being a part of and secured to axle 216. As the brake shoes move into engagement with the inner surface of the aforesaid drum, cam 234 is rendered stationary relative to axle 216. Thus, rollers 302 and hub 229 would revolve about cam 234 in the manner set forth above.

Having thus described the invention, what is claimed as new and desired to be secured by Letters Patent is:

1. In a power drive, an axle adapted to be held against rotation; cam means carried by the axle for normally free rotation thereon; a wheel having a hub carried by said axle for normally free rotation thereon; means shiftably mounted on said axle for releasably attaching the cam means to the axle; and power means carried by the hub for rotation therewith and engageable with the cam means for rotating the wheel when the cam means is attached to the axle.

2. In a power drive, an axle adapted to be held against rotation; cam means carried by the axle and having a continuous periphery eccentric to the axis of the axle; means shiftably mounted on said axle for releasably attaching the cam means to the axle; a wheel having a hub carried by said axle for rotation thereon; and power means carried by the hub for rotating the wheel and including a row of fluid-actuated piston and cylinder assemblies, each piston of each assembly having a connecting rod swingably secured thereto and engageable with said periphery for movement therearound as fluid under pressure is directed into the cylinders, the cam means being disposed to shift the pistons radially outwardly and oppositely to the direction of movement of the pistons in response to the fluid pressure.

3. The invention of claim 2, the axes of swinging movement of the connecting rods being parallel with said axis of the axle, said axes of the rods being substantially concentric with the axis of said periphery, said assemblies being disposed symmetrically about said axle.

4. The invention of claim 3, each rod having rollers engaging said periphery and spaced circumferentially of the latter, one of said rollers being in advance of the other of said rollers.

5. In a power drive, an axle adapted to be held against rotation; cam means carried by the axle for normally free rotation thereon; a wheel having a hub carried by said axle for normally free rotation thereon; releasable means for attaching the cam means to the axle; power means carried by the hub for rotation therewith and engageable with said cam means for rotating the wheel when the cam means are attached to the axle; and structure carried by the hub and said axle for controlling the power means when the cam means is attached to the axle.

6. The invention of claim 5, said power means including a row of fluid-actuated piston and cylinder assemblies, each piston of each assembly having a connecting rod swingably secured thereto and engageable with the cam means for movement therearound as fluid under pressure is directed into the assemblies, the cam means being disposed to shift the pistons radially outwardly and oppositely to the direction of movement of the pistons in response to the fluid pressure.

7. The invention of claim 6, said structure including valve means for each assembly respectively for controlling flow of fluid to and from the latter, each valve means having relatively shiftable parts on said hub and said axle respectively.

8. The invention of claim 7, said releasable means including fluid-actuated mechanism attaching the cam means to the axle.

9. The invention of claim 8, said axle being provided with passages for flow of fluid to and from the valve means, the assemblies and said mechanism during rotation of the wheel.

10. In a power drive:
a shaft adapted to be held against rotation;
cam means carried by the shaft for normally free rotation thereon;
means releasably securing the cam means to said shaft;
structure having a hub carried by said shaft for normally free rotation thereon;
a plurality of spaced, fluid-actuated piston and cylinder assemblies carried by the hub, each of the pistons of said assemblies having a connecting rod extending toward said shaft;
a roller secured to each rod respectively at that end thereof remote from the corresponding piston and engaging said periphery for movement therearound as said hub rotates about said shaft; and
means including valves for controlling the flow of fluid to and from said cylinders.

11. In a power drive:
a shaft adapted to be held against rotation;
cam means carried by the shaft for normally free rotation thereon;
shiftable pin means engageable with said cam means for releasably securing the latter to said shaft;
structure having a hub carried by said shaft for normally free rotation thereon;
a plurality of spaced, fluid-actuated piston and cylinder assemblies carried by the hub, each of the pistons of said assemblies having a connecting rod extending toward said shaft;
a roller secured to each rod respectively at that end thereof remote from the corresponding piston and engaging said periphery for movement therearound as said hub rotates about said shaft; and
means including valves for controlling the flow of fluid to and from said cylinders.

12. In a power drive:
a shaft adapted to be held against rotation;
cam means carried by the shaft for normally free rotation thereon;
shiftable disc means engageable with said cam means for releasably securing the latter to said shaft;
structure having a hub carried by said shaft for normally free rotation thereon;
a plurality of spaced, fluid-actuated piston and cylinder assemblies carried by the hub, each of the pistons of said assemblies having a connecting rod extending toward said shaft;
a roller secured to each rod respectively at that end thereof remote from the corresponding piston and engaging said periphery for movement therearound as said hub rotates about said shaft; and
means including valves for controlling the flow of fluid to and from said cylinders.

13. In a power drive:
a shaft adapted to be held against rotation;
cam means secured to said shaft and provided with a continuous periphery;
structure having a hub carried by said shaft for normally free rotation thereon;
a plurality of spaced, fluid-actuated piston and cylinder assemblies carried by the hub, each of the pistons of said assemblies having a connecting rod extending toward said shaft;
a roller secured to each rod respectively at that end thereof remote from the corresponding piston and engaging said periphery for movement therearound as said hub rotates about said shaft; and means including valves for controlling the flow of fluid to and from said cylinders, each valve having a reciprocable piston.

14. In a power drive:
a shaft adapted to be held against rotation;
elliptical cam means secured to said shaft and provided with a continuous periphery;
structure having a hub carried by said shaft for normally free rotation thereon;
a plurality of spaced, fluid-actuated piston and cylinder assemblies carried by the hub, each of the pistons of said assemblies having a swingable connecting rod extending toward said shaft;
a pair of rollers secured to each rod respectively at that end thereof remote from the corresponding piston and engaging said periphery for movement therearound as said hub rotates about said shaft; and
means including valves for controlling the flow of fluid to and from said cylinders, each valve having a reciprocable piston.

15. In a power drive:
a shaft adapted to be held against rotation;
cam means carried by the shaft for normally free rotation thereon;
means releasably securing the cam means to the shaft;
structure having a hub carried by said shaft for normally free rotation thereon;
a plurality of spaced, fluid-actuated piston and cylinder assemblies carried by the hub, each of the pistons of said assemblies having a swingable connecting rod extending toward said shaft;
a pair of rollers secured to each rod respectively at that end thereof remote from the corresponding piston and engaging said periphery for movement therearound as said hub rotates about said shaft; and
means including valves for controlling the flow of fluid to and from said cylinders, each valve having a reciprocable piston.

16. In a power drive:
a shaft adapted to be held against rotation;
cam means carried by the shaft for normally free rotation thereon;
shiftable pin means engageable with said cam means for releasably securing the latter to the shaft;
structure having a hub carried by said shaft for normally free rotation thereon;
a plurality of spaced, fluid-actuated piston and cylinder assemblies carried by the hub, each of the pistons of said assemblies having a swingable connecting rod extending toward said shaft;
a pair of rollers secured to each rod respectively at that end thereof remote from the corresponding piston and engaging said periphery for movement therearound as said hub rotates about said shaft; and
means including valves for controlling the flow of fluid to and from said cylinders, each valve having a reciprocable piston.

17. In a power drive:
a shaft adapted to be held against rotation;
cam means carried by the shaft for normally free rotation thereon;
shiftable disc means engageable with said cam means for releasably securing the latter to the shaft;
structure having a hub carried by said shaft for normally free rotation thereon;
a plurality of spaced, fluid-actuated piston and cylinder assemblies carried by the hub, each of the pistons of said assemblies having a swingable connecting rod extending toward said shaft;
a pair of rollers secured to each rod respectively at that end thereof remote from the corresponding piston and engaging said periphery for movement therearound as said hub rotates about said shaft; and
means including valves for controlling the flow of fluid to and from said cylinders, each valve having a reciprocable piston.

18. In a power drive:
a shaft adapted to be held against rotation;
cam means secured to said shaft and provided with a continuous periphery having a plurality of pairs of diametrically opposed lobes thereon;
structure having a hub carried by said shaft for normally free rotation thereon;
a plurality of spaced, fluid-actuated piston and cylinder assemblies carried by the hub, each of the pistons of said assemblies having a swingable connecting rod extending toward said shaft;
a pair of rollers secured to each rod respectively at that end thereof remote from the corresponding piston and engaging said periphery for movement therearound as said hub rotates about said shaft; and
means including valves for controlling the flow of fluid to and from said cylinders, each valve having a reciprocable piston.

19. In a power drive:
a shaft adapted to be held against rotation;
cam means carried by the shaft for normally free rotation thereon;
fluid-actuated clutch means coupled with said cam means for releasably securing the latter to said shaft;
means coupled with said clutch means for selectively actuating the same;
a hub carried by the shaft for normally free rotation thereon;
a plurality of spaced, fluid-actuated piston and cylinder assemblies carried by the hub, each of the pistons of said assemblies having a rod extending toward said shaft and coupled with said cam means for movement with respect thereto; and
means for controlling the flow of fluid to and from said cylinders.

References Cited by the Examiner
UNITED STATES PATENTS

| | | | |
|---|---|---|---|
| 1,122,972 | 12/14 | Maye | 91—202 |
| 1,151,602 | 8/15 | Minue | 121—59 |
| 1,757,483 | 5/30 | Hele-Shaw et al. | 121—59 |
| 2,350,683 | 6/44 | Jossim et al. | 121—59 |
| 2,418,123 | 4/47 | Joy | 121—59 X |
| 2,712,301 | 7/55 | Gravely et al. | 91—202 |
| 3,020,893 | 2/62 | Hamblin et al. | 121—59 |

FOREIGN PATENTS

| | | |
|---|---|---|
| 7,356 | 1914 | Great Britain. |
| 216,003 | 5/24 | Great Britain. |

JOSEPH H. BRANSON, Jr., *Primary Examiner.*
RALPH H. BRAUNER, *Examiner.*